(12) United States Patent
Kuehnel

(10) Patent No.: US 6,377,260 B1
(45) Date of Patent: Apr. 23, 2002

(54) METHOD OF DISPLAYING REAL AND IMAGINARY COMPONENTS OF A WAVEFORM

(75) Inventor: Richard John Kuehnel, Wiesbaden (DE)

(73) Assignee: The United States of America as represented by the National Security Agency, Washington, DC (US)

(*) Notice: Subject to any disclaimer, the term of this patent is extended or adjusted under 35 U.S.C. 154(b) by 0 days.

(21) Appl. No.: 09/489,621

(22) Filed: Jan. 24, 2000

(51) Int. Cl.$^7$ ............................................... G06T 11/20
(52) U.S. Cl. ..................... 345/440.1; 345/94; 345/208; 73/465
(58) Field of Search ............................. 345/440, 440.1, 345/440.2, 441, 134, 147, 208, 94, 88, 90, 589–605; 455/18; 76/465; 329/302, 304, 306

(56) References Cited

U.S. PATENT DOCUMENTS

| | | | | |
|---|---|---|---|---|
| 3,714,566 A | * | 1/1973 | Kang | 324/76.22 |
| 3,881,097 A | * | 4/1975 | Lehmann et al. | 708/405 |
| 3,991,304 A | * | 11/1976 | Hillsman | 600/538 |
| 4,802,098 A | * | 1/1989 | Hansen et al. | 702/67 |
| 4,991,119 A | * | 2/1991 | Traa | 348/185 |
| 5,025,411 A | * | 6/1991 | Tallman et al. | 345/175 |
| 5,280,429 A | * | 1/1994 | Withers | 378/70 |
| 5,596,344 A | * | 1/1997 | Kuwata et al. | 345/103 |
| 5,739,807 A | * | 4/1998 | Thong | 345/440.1 |
| 6,074,408 A | * | 6/2000 | Kullstam et al. | 329/304 |

OTHER PUBLICATIONS

Beverley Henderson West et al., "The Prentice–Hall Encyclopedia of Mathematics", 1982, pp. 76–77, Prentice–Hall Inc., Englewood Cliffs, New Jersey, U.S.A.
Robert W. Ramirez, "The FFT Fundamentals and Concepts," 1985, pp. 38–39, Prentice Hall Inc., Englewood Cliffs, New Jersey U.S.A.

* cited by examiner

*Primary Examiner*—Matthew Luu
*Assistant Examiner*—Thu-Thao Havan
(74) *Attorney, Agent, or Firm*—Robert D. Morelli

(57) ABSTRACT

The present invention is a method of obtaining a time history of a signal without having to integrate information on magnitude versus time and phase versus time by separately displaying sets of real and imaginary components of a signal verses time, including the steps of sampling the signal in time, where each time sample of the signal is described by a real and imaginary component; selecting a size of a display on a screen; determining the real and imaginary components for each time sample of the signal; selecting a user-definable number of samples to be displayed at any one instance; and displaying each time sample according to its real component along the X-axis, the imaginary component along the Y-axis, and the time associated with the time sample along the Z-axis.

23 Claims, 1 Drawing Sheet

METHOD OF DISPLAYING REAL AND IMAGINARY COMPONENTS OF A WAVEFORM

FIELD OF THE INVENTION

The present invention relates, in general, to computer graphics processing, operator interface processing, and selective visual display systems and, in particular, to waveform display (e.g., oscilloscope type).

BACKGROUND OF THE INVENTION

Signals are often described as complex numbers. A complex number is a number in the form of a+bi, where a and b are real numbers, and where i is the square root of −1. The first part of the complex number (i.e., a) is referred to as the real component, and the second part of the complex number (i.e., bi) is referred to as the imaginary component. The magnitude and phase of a signal are each derived from both the real and imaginary components of the complex number that represents the signal. The equations for finding the magnitude and phase of a signal described by a complex number may be found on page 39 of a 1995 book by Robert W. Ramirez, entitled "The FFT Fundamentals and Concepts." The magnitude of such a signal may be found by squaring the real component, squaring the imaginary component, summing the two squared terms, and finding the square root of the sum. The result of the square root is the magnitude. The phase is found by dividing the imaginary component by the real component and finding the inverse tangent of the quotient. The result of the inverse tangent is the phase. As you can see, both the real component and the imaginary component contribute to both the magnitude and the phase of the signal. Typical oscilloscopes display the magnitude or phase of a signal versus time, but not the real and imaginary components separately. By combining the real and imaginary components of a waveform on a single axis, the user is forced to mentally integrate the real and imaginary components from the combined information to get a sense of how the complex waveform evolves over time.

Where the phase of a signal is plotted versus time, the range of the phase is often artificially restrained to +/−180 degrees. Such a restriction complicates the phase depiction near these limits by causing abrupt shifts from +180 degrees to −180 degrees or vice versa. Such a distortion does not give the user a true sense of the phase history at these limits.

U.S. Pat. No. 5,739,807, entitled "METHOD FOR PRESENTING COMPLEX NUMBER WAVEFORMS," displays a complex waveform by (1) graphing the magnitude of the signal versus time while representing the phase of the signal by color or area under the curve or (2) graphing the phase of the signal versus time while representing the magnitude of the signal by color or area under the curve. To separate the real component from the imaginary component, a user must integrate the two different display forms of U.S. Pat. No. 5,739,807. Also, U.S. Pat. No. 5,739,807 does not disclose a method of displaying a signal represented by a complex number where the real and imaginary components are displayed separately as does the present invention. U.S. Pat. No. 5,739,807 is hereby incorporated by reference into the specification of the present invention.

Plotting a single set of the real and imaginary components is disclosed on page 76–77 of a book entitled "The Prentice Hall Encyclopedia of Mathematics which was published in 1982. However, this book does not disclose a method of displaying numerous sets of such plots with additional display features as does the present invention.

SUMMARY OF THE INVENTION

It is an object of the present invention to obtain a time history of a signal without having to integrate information on magnitude versus time and phase versus time.

It is another object of the present invention to obtain a time history of a signal by separately displaying sets of the real and imaginary components of a signal versus time.

The present invention is a method of obtaining a time history of a signal without having to integrate information on magnitude versus time and phase versus time by separately displaying sets of the real and imaginary components of a signal verses time.

The first step of the method is sampling a signal in time.

The second step of the method is selecting a user-definable size of a display.

The third step of the method is determining the real and imaginary components for each time sample of the signal.

The fourth step of the method is selecting a user-definable number of samples to be displayed at any one instance.

The fifth step of the method is displaying each sample to be displayed according to its real component along the X-axis, the imaginary component along the Y-axis, and the time associated with the sample along the Z-axis.

DETAILED DESCRIPTION

Figure 1:
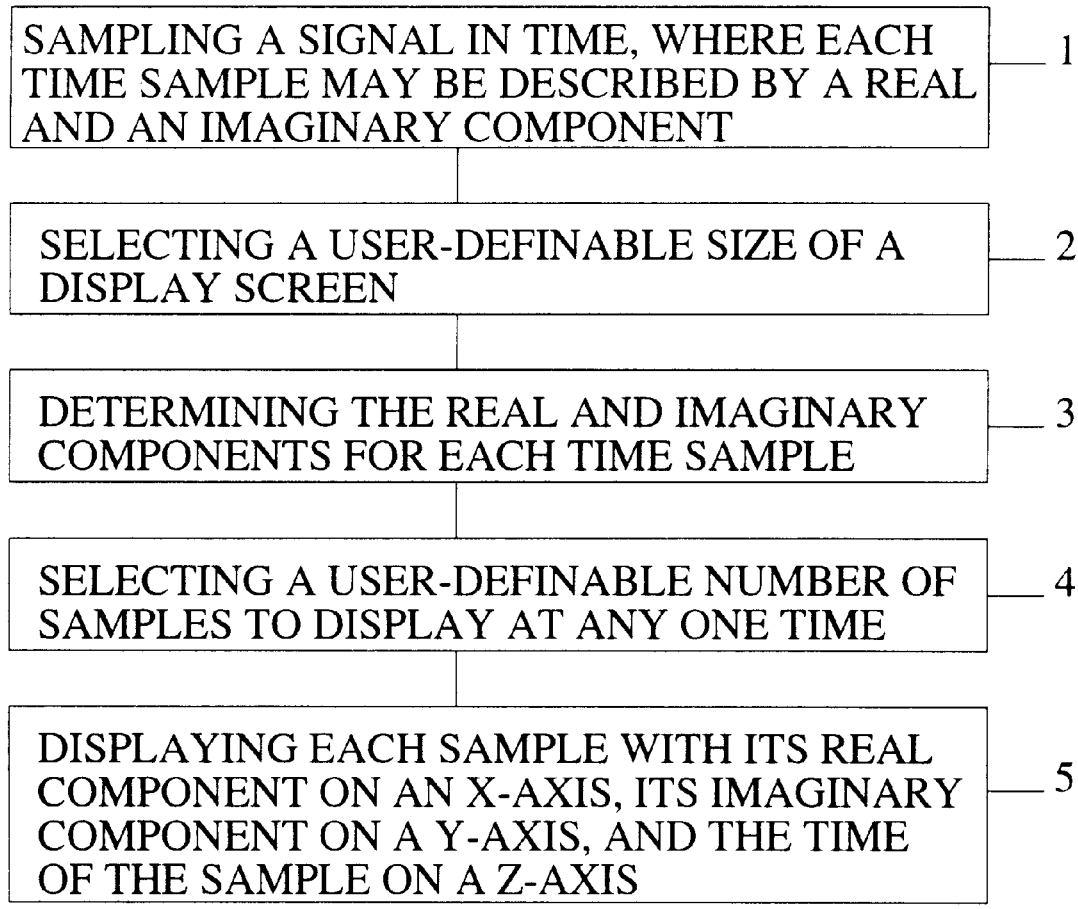
FIG. 1 is a list of the steps of the present invention.

The present invention is a method of obtaining a time history of a signal without having to integrate information on magnitude versus time and phase versus time by separately displaying sets of the real and imaginary components of a signal verses time.

FIG. 1 is a list of steps for the present method.

The first step 1 of the method is sampling a signal in time, where each time sample of the signal may be described by a real and imaginary component.

The second step 2 of the method is selecting a user-definable size of a display screen (e.g., oscilloscope screen), where the display includes an X-axis, a Y-axis, and a Z-axis, where, for each time sample of the signal, the real component is plotted on the X-axis, the imaginary component is plotted on the Y-axis, and the time of the sample is plotted on the Z-axis. To give the illusion of three dimensions, the Z-axis may be angled toward the center of the display area. When the X-axis, the Y-axis, and the Z-axis are visible, the real component is plotted on the X-axis, the imaginary component is plotted on the Y-axis, and time is plotted on the Z-axis.

In an alternate embodiment, the Z-axis may be perpendicular to the user. Here, the user only sees the X-axis and the Y-axis. Therefore, time has to be accounted for on the X-axis and the Y-axis. This is done by making the data plotted on the X-axis, $X_D$, and the Y-axis, $Y_D$, as follows:

$$X_D = (K_1 * X_S * Z_{DISPLAY})/Z_S,$$

where $K_1$ is a first user definable scale factor, $X_S$ is the real component of the sample to be plotted, $Z_{DISPLAY}$ is a user-definable value that represents the average distance between the user's eye and the display, and $Z_S$ is the time associated with the sample to be plotted; and $$Y_D = (K_2 * Y_S * Z_{DISPLAY})/Z_S,$$

where $K_2$ is a second user definable scale factor, and $Y_S$ is the imaginary component of the sample to be plotted, $Z_{DISPLAY}$ is a user-definable value that represents the average distance between the user's eye and the display, and $Z_S$ is the time associated with the sample to be plotted. Here the real and imaginary components are plotted separately, which provides the user with more information than if they were combined as in U.S. Pat. No. 5,739,807. In U.S. Pat. No. 5,739,807, samples are plotted on the X-axis, $X_D$, and the Y-axis, $Y_D$, as follows:

$$X_D = K_1 * Z_s,$$

where $K_1$ is a first user definable scale factor, and $Z_S$ is the time associated with the sample to be plotted; and $$Y_D = K_2 * X_S \text{ or}$$

$$Y_{D-K2}*(((X_S \cdot X_S)+(Y_S \cdot Y_S))^{\wedge}0.5).$$

To further give the illusion of three dimensions and the sense that the displayed signal is coming toward the viewer, each sample in time may be displayed using a different scale factor (e.g., later samples displayed with a smaller scale factor).

The third step 3 of the method is determining the real and imaginary components for each time sample of the signal.

The fourth step 4 of the method is selecting a user-definable number of samples to be displayed at any one instance. The samples may be displayed in fixed mode or continuous mode. In fixed mode, only the first user-definable number of samples are displayed. In continuous mode, the user-definable number of samples are displayed first and then replaced one sample at a time. In other words, the first user-definable number of samples are displayed, the oldest sample is removed, the remaining samples move up one position along the Z-axis, and the next sample is added to the Z-axis.

The fifth step 5 of the method is displaying each sample to be displayed according to its real component along the X-axis, the imaginary component along the Y-axis, and the time associated with the sample along the Z-axis. A marker may be added to each sample displayed in time to make it easier for the viewer to distinguish the displayed samples in time. Also, the resolution between displayed samples may be increased to smooth transitions between data points. Furthermore, a line may be connected between the displayed samples to make it easier for the viewer to see how the displayed signal changes with time. Further still, the three dimensional effect may be enhanced by doing one or any combination of the following: vary the color of the line segments between displayed samples, vary the thickness of the line segments between displayed samples, and display the samples stereoscopically.

The preferred way of varying the color of line segments between displayed samples is to vary the contribution of red, green, and blue for each segment. Each color is represented by a number of bits. In the preferred embodiment, 5 bits per color are used. With 5 bits (i.e., 00000 to 11111 in binary), 32, or $2^5$, intensities of each color may be selected. If greater color variations are needed, more bits (e.g., 24) may be used to represent each color, but more bits requires more processing time. The display is divided into three section, a rear section, a middle section, and a front section. Only the color red is varied in the rear section, going from 0, or 00000 in binary, at the farthest point to 32, or 11111 in binary, at the boundary between the rear section and the middle section, while green and blue remain at 0. In the middle section, red remains as 32 and blue remains at 0 while green is varied from 0 to 32. In the front section, red and green remain at 32, and blue is varied from 0 to 32. The effect is that the rear section goes from black to bright red, the middle section goes from bright red to yellow, and the front section goes from yellow to white. This gives the illusion of three dimensions.

The preferred way of varying the thickness of line segments between displayed samples is to have the segments go from thin to thick as the segments proceed from the rear section to the front section of the display.

The present invention may also employ a device that presents the user with slightly different images to each eye and, therefore, a stereoscopic view of the display.

What is claimed is:

1. A method of obtaining a time history of a signal without having to integrate information on magnitude versus time and phase versus time by separately displaying sets of real and imaginary components of a signal verses time, comprising the steps of:

a) sampling the signal in time, where each time sample of the signal is described by a real and imaginary component, b) selecting a user-definable size of a display on a screen, where the display includes an X-axis, a Y-axis, and a Z-axis;

c) determining the real and imaginary components for each time sample of the signal;

d) selecting a user-definable number of samples to be displayed at any one instance; and e) displaying each time sample according to its real component along the X-axis, the imaginary component along the Y-axis, and the time associated with the time sample along the Z-axis.

2. The method of claim 1, wherein said step of selecting a user-definable size of a display on a screen is comprised of the step of angling the Z-axis to give the illusion of three dimensions.

3. The method of claim 1, wherein said step of displaying each time sample is comprised of the step of displaying each time sample using a different scale factor to give the illusion of three dimensions and the sense that the displayed signal is coming toward the viewer.

4. The method of claim 1, wherein said step of displaying each time sample is comprised of the step of displaying each time sample in fixed mode so that only the first user-definable number of samples are displayed.

5. The method of claim 1, wherein said step of displaying each time sample is comprised of the step of displaying each time sample in continuous mode so that the user-definable number of samples are displayed first and then replaced one sample at a time so that a first of the user-definable number of times samples are displayed, the time sample that is oldest is removed, the remaining time samples move up one position along the Z-axis, and a next time sample is added to the Z-axis.

6. The method of claim 1, wherein said step of displaying each time sample according to its real component along the X-axis, the imaginary component along the Y-axis, and the time associated with the time sample along the Z-axis is comprised of the steps of:

a) displaying a value $X_D$ on the X-axis as follows:

$$X_D = (K_1 * X_S * Z_{DISPLAY})/Z_S,$$

where the Z-axis is perpendicular to the user, where $K_1$ is a first user-definable scale factor, where $X_S$ is the real component of the sample to be plotted, where $Z_{DISPLAY}$ is a user-definable value that represents the average distance between the user's eye and the display, and where $Z_S$ is the time associated with the sample to be plotted; and b) displaying a value $Y_D$ on the Y-axis as follows:

$$Y_D=(K_2 * Y_S * Z_{DISPLAY})/Z_S,$$

where the Z-axis is perpendicular to the user,
where $K_2$ is a second user-definable scale factor,
where $Y_S$ is the imaginary component of the sample to be plotted,
where $Z_{DISPLAY}$ is a user-definable value that represents the average distance between the user's eye and the display, and
where $Z_S$ is the time associated with the sample to be plotted.

7. The method of claim 1, further including the step of including a marker at each displayed time sample to make it easier for a viewer to distinguish the displayed time samples.

8. The method of claim 1, further including the step of increasing the resolution between displayed time samples to smooth transitions between displayed time samples.

9. The method of claim 1, further including the step of connecting a line between the displayed time samples to make it easier for the viewer to see how the displayed time samples change with time.

10. The method of claim 9, further including the step of varying the color of the line between the displayed time samples.

11. The method of claim 9, further including the step of varying the thickness of the line between the displayed time samples.

12. The method of claim 1, further including the step of displaying the time samples stereoscopically.

13. The method of claim 10, wherein said step of varying the color of the line between the displayed time samples is comprised of the steps of:

a) representing each displayed time sample with the colors red, green, and blue, and where the intensity of each color is varied according to a five bit binary number;

b) dividing the display into a rear section, a middle section, and a front section;

c) varying the red color in the rear section for each displayed time sample from 0 to 32 as each displayed time sample progresses from the rear section to the front section, where the colors blue and green are each 0;

d) varying the green color in the middle section for each displayed time sample from 0 to 32 as each displayed time sample progresses from the rear section to the front section, where the color red is 32, and where the color blue is 0; and e) varying the blue color in the front section for each displayed time sample from 0 to 32 as each displayed time sample progresses from the rear section to the front section, where the colors red and green are each 32.

14. The method of claim 2, wherein said step of displaying each time sample is comprised of the step of displaying each time sample using a different scale factor to give the illusion of three dimensions and the sense that the displayed signal is coming toward the viewer.

15. The method of claim 14, wherein said step of displaying each time sample is comprised of the step of displaying each time sample in continuous mode so that the user-definable number of samples are displayed first and then replaced one sample at a time so that a first of the user-definable number of times samples are displayed, an oldest of the time samples is removed, the remaining time samples move up one position along the Z-axis, and a next time sample is added to the Z-axis.

16. The method of claim 15, wherein said step of displaying each time sample according to its real component along the X-axis, the imaginary component along the Y-axis, and the time associated with the time sample along the Z-axis is comprised of the steps of:

a) displaying a value $X_D$ on the X-axis as follows:

$$X_D=(K_1 * X_S * Z_{DISPLAY})/Z_S,$$

where the Z-axis is perpendicular to the user,
where $K_1$ is a first user-definable scale factor,
where $X_S$ is the real component of the sample to be plotted,
where $Z_{DISPLAY}$ is a user-definable value that represents the average distance between the user's eye and the display, and
where $Z_S$ is the time associated with the sample to be plotted; and b) displaying a value $Y_D$ on the Y-axis as follows:

$$Y_D=(K_2 * Y_S * Z_{DISPLAY})/Z_S,$$

where the Z-axis is perpendicular to the user,
where $K_2$ is a second user-definable scale factor,
where $Y_S$ is the imaginary component of the sample to be plotted,
where $Z_{DISPLAY}$ is a user-definable value that represents the average distance between the user's eye and the display, and
where $Z_S$ is the time associated with the sample to be plotted.

17. The method of claim 16, further including the step of including a marker at each displayed time sample to make it easier for a viewer to distinguish the displayed time samples.

18. The method of claim 17, further including the step of increasing the resolution between displayed time samples to smooth transitions between displayed time samples.

19. The method of claim 18, further including the step of connecting a line between the displayed time samples to make it easier for the viewer to see how the displayed time samples change with time.

20. The method of claim 19, further including the step of varying the color of the line between the displayed time samples.

21. The method of claim 20, further including the step of varying the thickness of the line between the displayed time samples.

22. The method of claim 21, further including the step of displaying the time samples stereoscopically.

23. The method of claim 22, wherein said step of varying the color of the line between the displayed time samples is comprised of the steps of:

a) representing each displayed time sample with the colors red, green, and blue, and where the intensity of each color is varied according to a five bit binary number;

b) dividing the display into a rear section, a middle section, and a front section;

c) varying the red color in the rear section for each displayed time sample from 0 to 32 as each displayed time sample progresses from the rear section to the front section, where the colors blue and green are each 0;

d) varying the green color in the middle section for each displayed time sample from 0 to 32 as each displayed time sample progresses from the rear section to the front section, where the color red is 32, and where the color blue is 0; and e) varying the blue color in the front section for each displayed time sample from 0 to 32 as each displayed time sample progresses from the rear section to the front section, where the colors red and green are each 32.

\* \* \* \* \*